United States Patent
Kim et al.

(10) Patent No.: US 12,224,391 B2
(45) Date of Patent: Feb. 11, 2025

(54) VACUUM CARRIER

(71) Applicant: MPLUS CORP, Cheongju-si (KR)

(72) Inventors: Jong Sung Kim, Seongnam-si (KR); Kang Ho Ko, Yongin-si (KR); Sung Moon Kim, Cheongju-si (KR)

(73) Assignee: MPLUS CORP, Cheongju-si (KR)

( * ) Notice: Subject to any disclaimer, the term of this patent is extended or adjusted under 35 U.S.C. 154(b) by 242 days.

(21) Appl. No.: 17/773,454

(22) PCT Filed: Jun. 10, 2020

(86) PCT No.: PCT/KR2020/007475
§ 371 (c)(1),
(2) Date: Apr. 29, 2022

(87) PCT Pub. No.: WO2021/066289
PCT Pub. Date: Apr. 8, 2021

(65) Prior Publication Data
US 2023/0361334 A1    Nov. 9, 2023

(30) Foreign Application Priority Data
Oct. 2, 2019 (KR) .......................... 10-2019-0122552

(51) Int. Cl.
*H01M 10/04* (2006.01)
*B25B 11/00* (2006.01)

(52) U.S. Cl.
CPC ....... *H01M 10/0404* (2013.01); *B25B 11/005* (2013.01)

(58) Field of Classification Search
CPC .. H01M 10/0404; H01M 10/04; H01M 50/10; H01M 4/04; H01M 50/116;
(Continued)

(56) References Cited

U.S. PATENT DOCUMENTS

2023/0163343 A1* 5/2023 Kim .................. H01M 10/0404
                                                      429/163
2024/0182255 A1* 6/2024 Kim ...................... B65H 16/00

FOREIGN PATENT DOCUMENTS

CN     114744274 A  *  7/2022
CN     219058077 U  *  5/2023
(Continued)

OTHER PUBLICATIONS

Protection Film Packaging Apparatus For Secondary Cell; Document ID: KR 101903367 B1; Date Published: Oct. 2, 2018; Inventor: Jung Young Tae; Date Filed: Oct. 26, 2017 (Year: 2018).*
(Continued)

*Primary Examiner* — Mahdi H Nejad
(74) *Attorney, Agent, or Firm* — NKL LAW; Jae Youn Kim

(57) ABSTRACT

Proposed is a vacuum carrier. The vacuum carrier includes a vacuum base having vacuum passages (20VP and 30VP) formed therein, the vacuum passages (20VP and 30VP) being connected to vacuum suction holes (24 and 34), and includes a vacuum unit configured to form a vacuum by suctioning air from the vacuum passages (20VP and 30VP) inside the vacuum base. Further, the vacuum unit includes a vacuum filling block (51) having suction ports connected to a vacuum apparatus, and includes a movement driving apparatus configured to move the vacuum filling block (51) such that the suction ports of the vacuum filling block (51) are connected to the vacuum passages (20VP and 30VP) inside the vacuum base.

2 Claims, 6 Drawing Sheets

(58) Field of Classification Search
CPC .... H01M 10/049; B25B 11/005; Y02E 60/10;
Y02P 70/50; B29C 2791/006
See application file for complete search history.

(56) References Cited

FOREIGN PATENT DOCUMENTS

| | | | | |
|---|---|---|---|---|
| CN | 220884940 | U | * | 5/2024 |
| JP | 2013-014795 | A | | 1/2013 |
| KR | 10-1094928 | B1 | | 12/2011 |
| KR | 20170142649 | A | * | 12/2017 |
| KR | 101903367 | B1 | * | 10/2018 |
| KR | 101957503 | B1 | * | 3/2019 |
| KR | 10-2019005 | B1 | | 9/2019 |
| KR | 102311430 | B1 | * | 10/2021 |

OTHER PUBLICATIONS

International Search Report for PCT/KR2020/007475 dated Sep. 15, 2020.
Written Opinion for PCT/KR2020/007475 dated Sep. 15, 2020.

* cited by examiner

VACUUM CARRIER

CROSS REFERENCE TO RELATED APPLICATIONS

This application is a National Stage of International Application No. PCT/KR2020/007475 filed Jun. 10, 2020, claiming priority based on Korean Patent Application No. 10-2019-0122552 filed Oct. 2, 2019.

TECHNICAL FIELD

The present disclosure relates to a vacuum carrier capable of maintaining and restoring a vacuum pressure for each of various stages in a secondary battery manufacturing process, the vacuum carrier being also capable of preventing a position of a pouch from being misaligned during performing various processes such as a process of opening and closing a carrier in each process stage of a secondary battery.

BACKGROUND ART

A secondary battery is rechargeable and may have a small size and a large capacity. The secondary battery may be classified into a can shape secondary battery and a pouch shape secondary battery. Further, the pouch shape secondary battery includes a battery cell having a first side of an electrode plate formed with an electrode tab, and includes a pouch covering and sealing the electrode plate such that the electrode tab is led to the outside. The battery cell is formed such that separators are respectively interposed between positive electrode plates and negative electrode plates, and has a structure in which the battery cell is sealed by being mounted in the pouch and the electrode tab at the first side of the battery cell is led outside of the pouch. A battery cell in which such a battery cell is mounted in a pouch is referred to as a pouch shape secondary battery.

At this time, an operation is performed for each of various stages during manufacturing the secondary battery, and a means for supplying a vacuum for each of various stages is required. That is, an efficient means for maintaining and restoring a vacuum pressure by supplying a vacuum for each secondary battery manufacturing stage is required.

In addition, a misalignment of a pouch may occur in each process stage of the secondary battery, and a setback occur when the misalignment of the pouch occurs.

DISCLOSURE

Technical Problem

An objective of the present disclosure is to provide a vacuum carrier, the vacuum carrier being capable of maintaining a vacuum pressure in each stage of a secondary battery manufacturing process, the vacuum carrier being capable of maintaining a vacuum pressure to a predetermined vacuum pressure at all times by restoring a vacuum pressure at an appropriate time when the vacuum pressure is below the predetermined vacuum pressure, and the vacuum carrier being capable of fixing a pouch by using a stabilized vacuum pressure during performing various processes such as opening and closing the vacuum carrier in each process stage of a secondary battery, thereby being capable of preventing a position of a pouch from being misaligned.

Technical Solution

In order to achieve the above objective, according to the present disclosure, there is provided a vacuum carrier, the vacuum carrier including: a vacuum base having vacuum passages formed therein, the vacuum passages being connected to vacuum suction holes; and a vacuum unit configured to form a vacuum by suctioning air from the vacuum passages inside the vacuum base.

Advantageous Effects

According to the vacuum carrier of the present disclosure, since a vacuum pressure is formed at various stages during manufacturing a secondary battery and the vacuum pressure is restored when the vacuum pressure is reduced below a predetermined vacuum pressure, the vacuum carrier may be efficiently utilized at each stage of a secondary battery manufacturing process.

In addition, by numerically displaying the vacuum pressure on display apparatuses of a vacuum display unit, the vacuum pressure acting on each of the vacuum suction holes of a vacuum base plate and a vacuum folding plate, whether the vacuum pressure is properly acting on the vacuum base plate and the vacuum folding plate may be easily checked, and a required action may be properly performed by identifying whether the vacuum pressure is properly acted.

In addition, in each stage of the secondary battery manufacturing stage, since a pouch is fixed by the vacuum pressure when the vacuum carrier is opened or closed, there is an effect that the pouch is prevented from being misaligned.

BEST MODE

Figure 1:
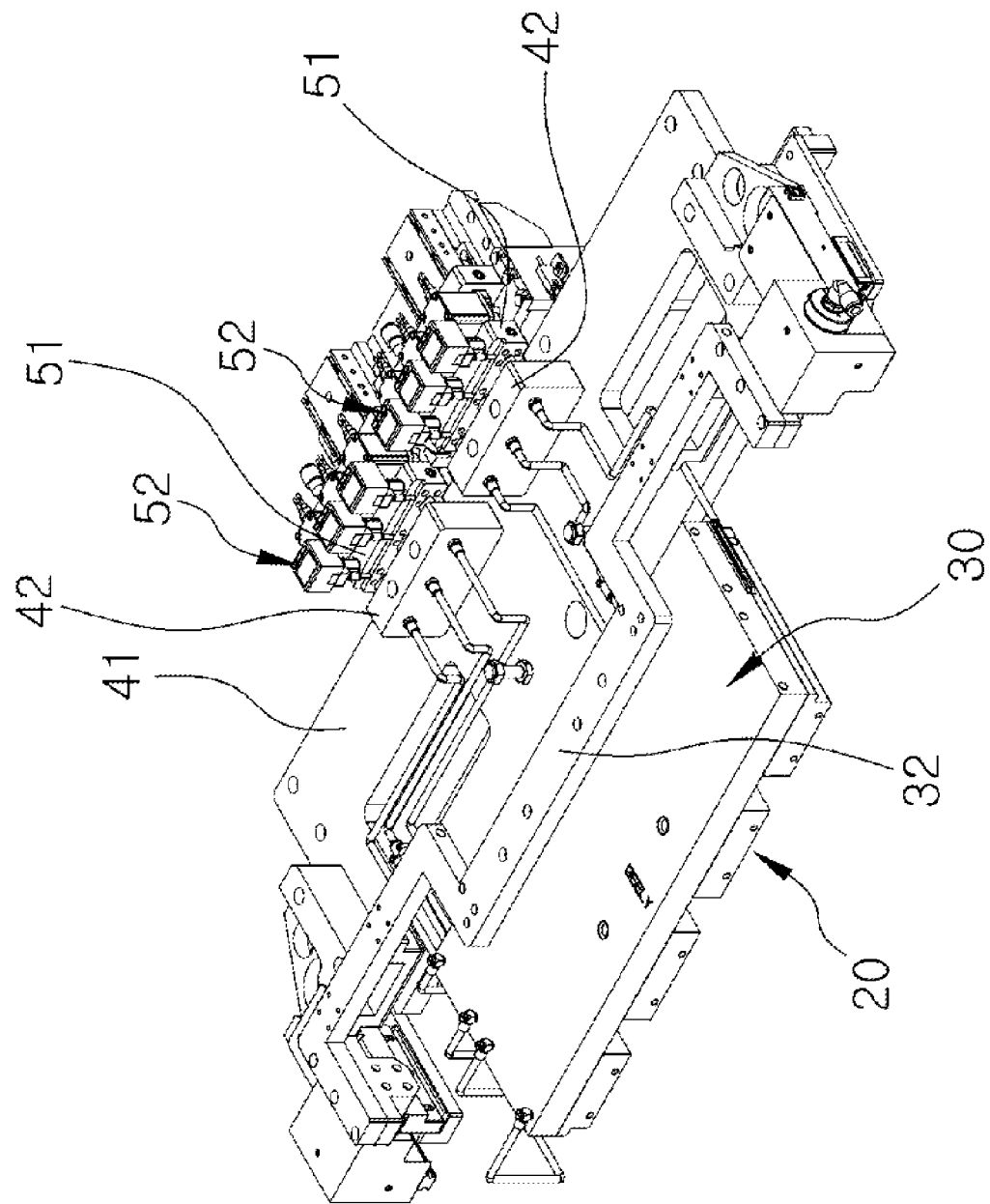
FIG. 1 is a perspective view illustrating a vacuum carrier according to the present disclosure.
Figure 2:
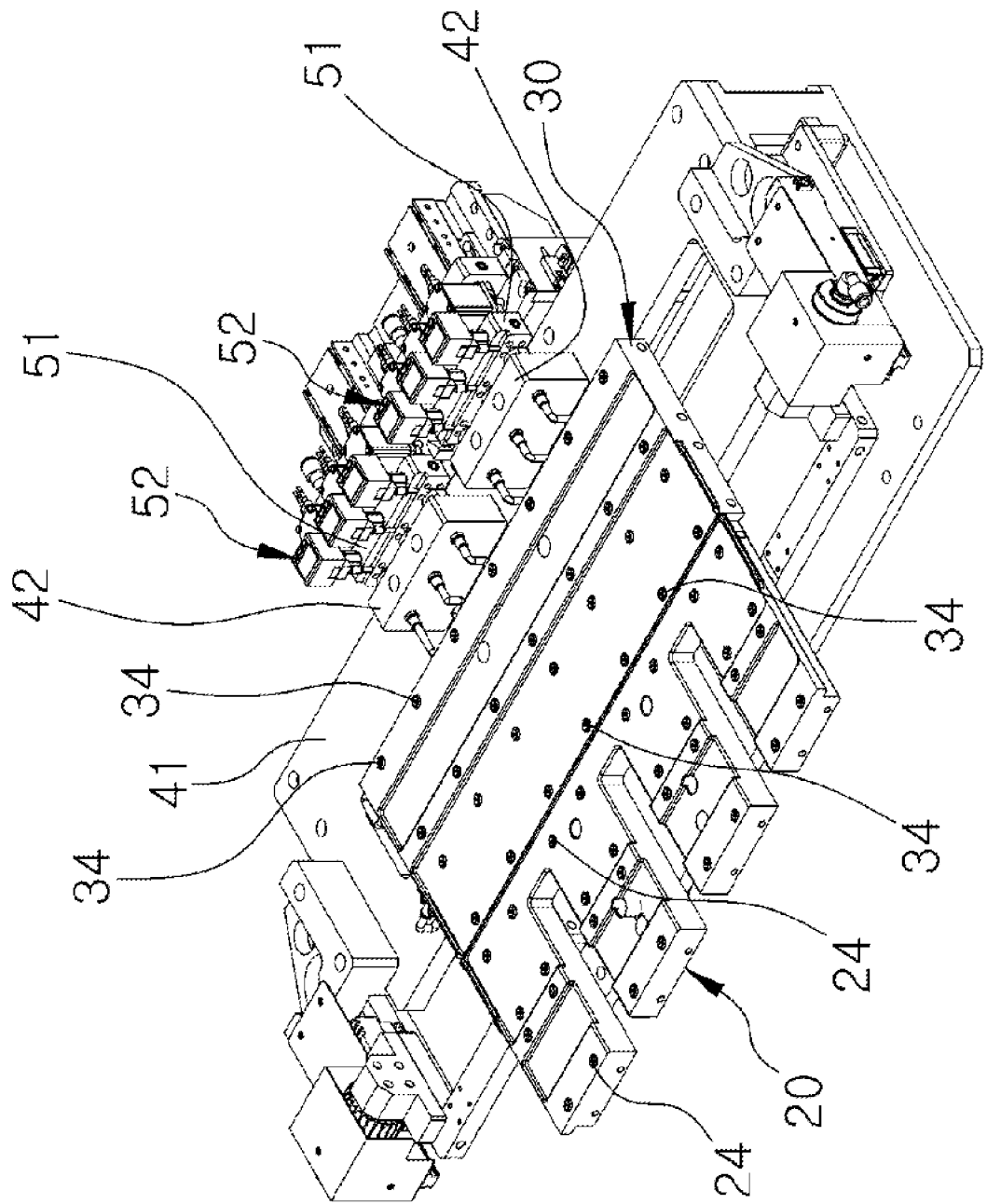
FIG. 2 is a perspective view illustrating a state in which a vacuum folding plate is unfolded from a vacuum base plate that is a main part of FIG. 1.
Figure 3:
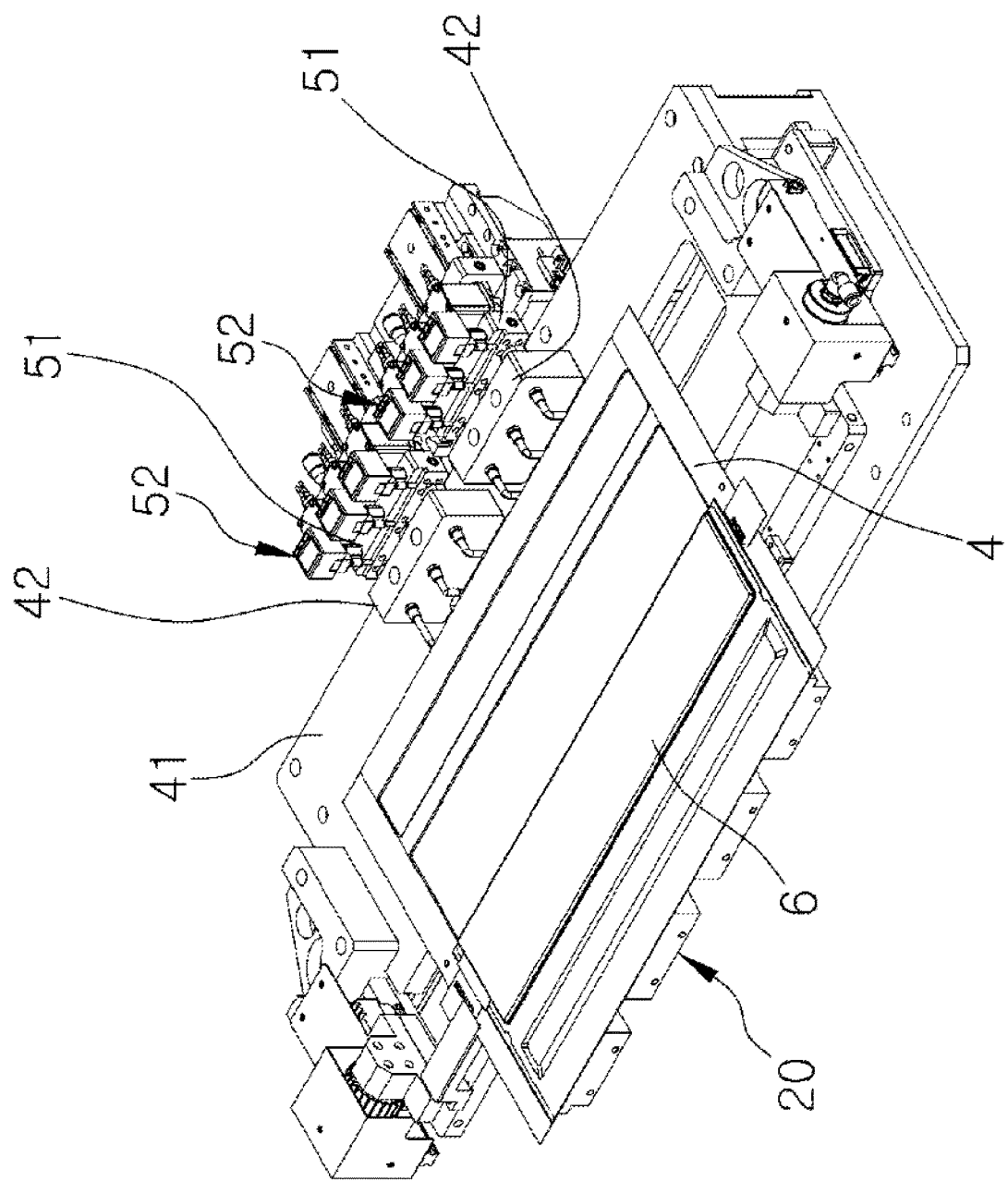
FIG. 3 is a plan view illustrating a state in which a pouch sheet is seated on the vacuum base plate and the vacuum folding plate of FIG. 2.
Figure 4:
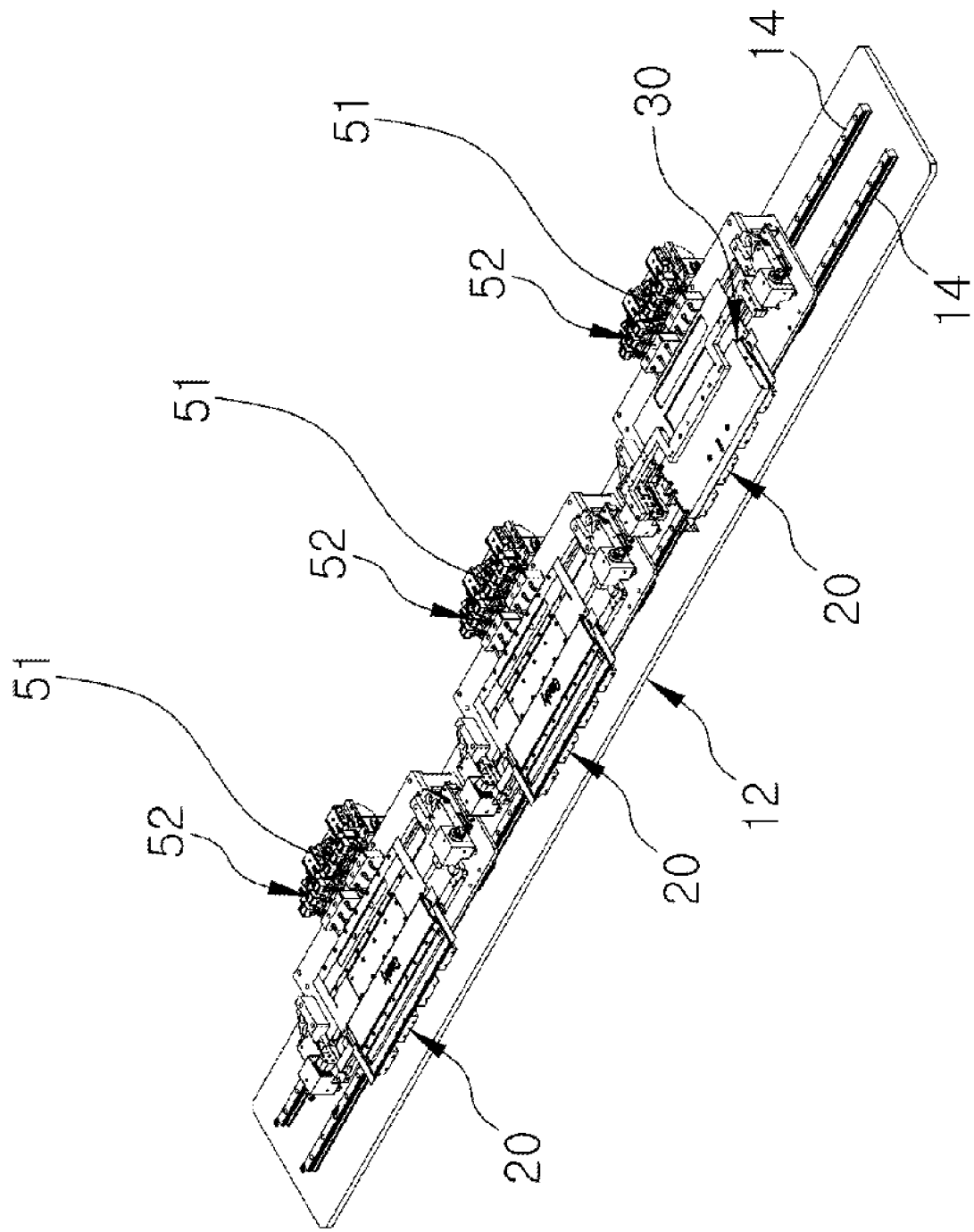
FIG. 4 is a perspective view illustrating a state in which a plurality of vacuum carriers of FIG. 1 is disposed.
Figure 5:
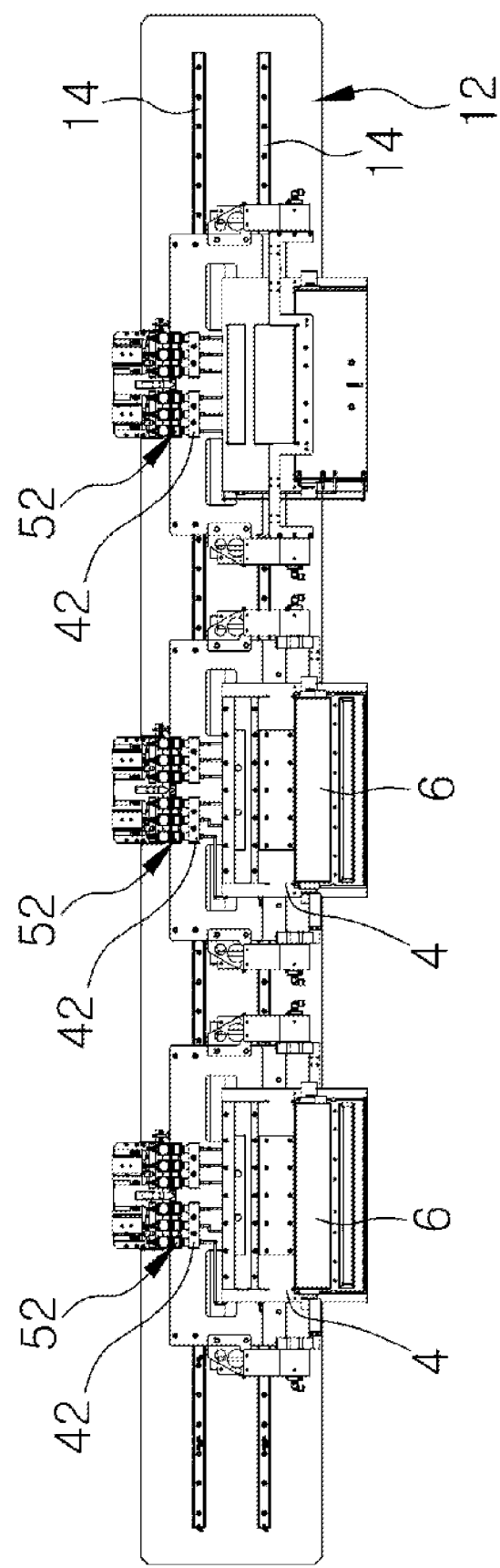
FIG. 5 is a plan view of FIG. 4.

In a best mode of a vacuum carrier of the present disclosure, the vacuum carrier includes: a vacuum base having vacuum passages formed therein and vacuum suction holes are connected to the vacuum passages; and a vacuum unit configured to form a vacuum by suctioning air from the vacuum passages inside the vacuum base. Further, the vacuum unit includes: vacuum filling blocks having suction ports connected to a vacuum apparatus; and a movement driving apparatus configured to move the vacuum filling blocks such that the suction ports of the vacuum filling block are connected to the vacuum passages inside the vacuum base.

MODE FOR INVENTION

A vacuum carrier according to the present disclosure includes a vacuum base having vacuum passages 20VP and 30VP formed therein and vacuum suction holes 24 and 34 connected to the vacuum passages 20VP and 30VP, and includes a vacuum unit configured to form a vacuum by suctioning air from the vacuum passages 20VP and 30VP inside the vacuum base. The vacuum carrier of the present disclosure connects a vacuum apparatus to vacuum connection blocks 42 via vacuum filling blocks 51 such that a vacuum pressure is maintained restored for each stage of a secondary battery manufacturing process.

In the present disclosure, the vacuum unit includes the vacuum filling blocks 51 and a movement driving apparatus, and the vacuum base includes a vacuum base plate 20 and a vacuum folding plate 30. The vacuum base includes the vacuum connection blocks 42.

The vacuum folding plate 30 is folded into an inner surface of the vacuum base plate 20, so that the inner surface of the vacuum base plate 20 and the vacuum folding plate 30 are disposed to face each other. Further, the vacuum folding plate 30 is unfolded outward from the inner surface of the vacuum base plate 20.

The vacuum base plate 20 is mounted at a support frame 41. A support bar 32 is connected between the vacuum base plate 20 and the support frame 41, so that a structure in which the vacuum base plate 20 is mounted at the support frame 41 is formed. The vacuum base plate 20 mounted at the support frame 41 is disposed such that the inner surface of the vacuum base plate 20 faces upward.

At the same time when the vacuum folding plate 30 is supported by the support frame 41, the vacuum folding plate 30 is folded into the inner surface of the vacuum base plate 20 and is unfolded outward from the inner surface of the vacuum base plate 20 by a folding driving unit. The vacuum folding plate 30 is formed in a rectangular plate shape, and is provided with sectored vacuum folding plate portions divided into a plurality of parts. In the present disclosure, the vacuum folding plate 30 is provided with four sectored vacuum folding plate portions.

In a state in which the vacuum folding plate 30 is unfolded from the vacuum base plate 20, the vacuum folding plate 30 is disposed such that an inner surface of the vacuum folding plate 30 faces upward.

The vacuum passages 20VP and 30VP are provided inside the vacuum base plate 20 and the vacuum folding plate 30. Further, the plurality of vacuum suction holes 24 and 34 communicating with the vacuum passages 20VP and 30VP are provided in the inner surface of the vacuum base plate 20 and the inner surface of the vacuum folding plate 30, the inner surfaces facing each other. The vacuum suction holes 24 of the vacuum base plate 20 are connected to the vacuum passages 20VP inside the vacuum base plate 20, and are also open toward the inner surface of the vacuum base plate 20. The vacuum suction holes 24 of the vacuum base plate 20 are separated into several sections, and the vacuum suction holes 24 separated into the several sections are in communication with a plurality of vacuum lines VL while being in a separated state.

In addition, the vacuum suction holes 34 of the vacuum folding plate 30 are also connected to the vacuum passages 30VP inside the vacuum folding plate 30, and are also open toward the inner surface of the vacuum folding plate 30. The vacuum suction holes 34 of the vacuum folding plate 30 are also separated into several sections, and the vacuum suction holes 34 separated into the several sections are in communication with other plurality of vacuum lines VL different from the vacuum lines VL connected to the vacuum suction holes 24 of the vacuum base plate 20 while the vacuum suction holes 34 are in a separated state.

A rotation support member is connected to the vacuum folding plate 30. Further, in a state in which the rotation support member is rotatably supported on the support frame 41, the rotation support member is rotated to the inner surface of the vacuum base plate 20 and is rotated outward from the inner surface of the vacuum base plate 20 by a folding driving unit, so that the vacuum folding plate 30 is capable of being folded into the inner surface of the vacuum base plate 20 and is capable of being unfolded outward from the inner surface of the vacuum base plate 20. At this time, the folding driving unit may be configured of a motor in which a motor shaft is connected to the rotation support member such that a rotational force is capable of being transferred to the rotation movement member, or may be formed of a cylinder, a rack gear, a pinion gear, and so on which are disposed between the support frame 41 and the rotation support member such that the rotation support member can perform a rotation movement. A means capable of folding or unfolding the vacuum folding plate 30 toward the inner surface of the vacuum base plate 20, the vacuum folding plate 30 being connected to the rotation support member, may be employed as the folding driving unit.

Meanwhile, the support frame 41 on which the vacuum base plate 20 and the vacuum folding plate 30 are supported is slidably coupled to a guide rail of a bottom frame 10, so that the vacuum base plate 20, the vacuum folding plate 30, and a vacuum display unit are capable of being moved along the bottom frame 10.

The plurality of vacuum lines VL (preferably, configured of flexible hoses) connected to the vacuum passages 20VP and 30VP of the vacuum base plate 20 and the vacuum folding plate 30 is supported by the vacuum connection blocks 42, and the vacuum connection blocks 42 are mounted on the support frame 41.

The vacuum passages 20VP and 30VP inside the vacuum base plate 20 and the vacuum folding plate 30 are connected to the vacuum display unit. The vacuum display unit includes display apparatuses 52 and the movement driving apparatus.

The vacuum filling blocks 51 are supported such that the vacuum filling blocks 51 are capable of moving forward and backward in the bottom frame 10. The movement driving apparatus such as a cylinder is mounted on an upright bottom frame portion of the bottom frame 10, and the vacuum filling blocks 51 are connected to cylinder rods of the cylinders. A movement of the vacuum filling blocks 51 may be performed by the movement driving apparatus such as a cylinder. The vacuum filling blocks 51 are operated to be moved forward and backward on a position facing the vacuum connection blocks 42 that support the vacuum lines VL which are connected to the vacuum passages 20VP and 30VP of the vacuum base plate 20 and the vacuum folding plate 30. Vacuum pressure ports of the vacuum filling blocks 51 are connected to the vacuum apparatus that is not illustrated.

The vacuum filling blocks 51 are moved by the movement driving apparatus, thereby allowing suction ports of the vacuum filling blocks 51 to be connected to the vacuum passages 20VP and 30VP inside the vacuum base. That is, in a state in which the vacuum filling blocks 51 are moved forward to the vacuum connection blocks 42 by the movement driving apparatus and the vacuum filling blocks 51 are connected to the plurality of vacuum lines VL, a vacuum pressure is formed by suctioning air from the vacuum passages 20VP and 30VP inside the vacuum base plate 20 and the vacuum folding plate 30.

Both the vacuum passages 20VP and the vacuum suction holes 24 inside the vacuum base plate 20 and both the vacuum passages 30VP and the vacuum suction holes 34 inside the vacuum folding plate 30 are connected to the vacuum apparatus, which is not illustrated, by the vacuum lines VL, the vacuum connection blocks 42, and the vacuum filling blocks 51. By suctioning air through the vacuum passages 20VP inside the vacuum base plate 20 by using the vacuum apparatus, a vacuum pressure may act on the vacuum suction holes 24 open toward the inner surface of the vacuum base plate 20. Further, by suctioning air through the vacuum passages 30VP inside the vacuum folding plate 30, the vacuum pressure may act on the vacuum suction holes 34 open toward the inner surface of the vacuum folding plate 30.

According to the present disclosure as described above, the vacuum lines VL are connected to the vacuum passages 20VP and 30VP inside the vacuum base plate 20 and the vacuum folding plate 30 and to the plurality of vacuum suction holes 24 and 34, and the vacuum lines VL are supported on the vacuum connection blocks 42. Further, vacuum connection paths are formed in the vacuum connection blocks 42, and check valves are mounted at the vacuum connection paths. Therefore, in a state in which vacuum ports of the vacuum filling blocks 51 where the display apparatuses 52 are supported are connected to the vacuum lines VL that is supported on the vacuum connection blocks 42, by operating the vacuum apparatus connected to each of the vacuum ports of the vacuum filling blocks 51, the vacuum pressure is formed on the vacuum passages 20VP and 30VP inside the vacuum base plate 20 and the vacuum folding plate 30 that are connected to the vacuum lines VL. The vacuum pressure in the vacuum passages 20VP and 30VP inside the vacuum base plate 20 and the vacuum folding plate 30 may be maintained by the check valves. The check valves may be mounted at a portion of the vacuum base plate 20. That is, the check valves may be mounted at a portion of the vacuum base plate 20 and the vacuum folding plate 30. Further, by the check valves, the vacuum pressure acting on the vacuum suction holes 24 and 34 that are open toward the inner surfaces of the vacuum base plate 20 and the vacuum folding plate 30 is maintained for a predetermined time.

The vacuum carrier of the present disclosure has characteristics in which a vacuum pressure is formed for each stage of the secondary battery manufacturing process and the vacuum pressure is restored again when the vacuum pressure is reduced below a predetermined vacuum pressure.

In a state in which a vacuum pressure equal to or more than the predetermined vacuum pressure is applied on each of the vacuum suction holes 24 and 34 of the vacuum base plate 20 and the vacuum folding plate 30, the vacuum filling blocks 51 are moved backward from the vacuum connection blocks 42. Further, when a vacuum pressure acting on each of the vacuum suction holes 24 and 34 of the vacuum base plate 20 and the vacuum folding plate 30 is reduced below the predetermined vacuum pressure, the vacuum apparatus is operated in a state in which the vacuum filling blocks 51 are moved forward and are connected to the vacuum connection blocks 42, and the vacuum pressure acting on each of the vacuum suction holes 24 and 34 of the vacuum base plate 20 and the vacuum folding plate 30 is maintained to the vacuum pressure equal to or more than the predetermined vacuum pressure. That is, a vacuum pressure is restored by connecting the vacuum filling blocks 51 to the vacuum connection blocks 42. For example, when the predetermined vacuum pressure is set to 60 kPa, a vacuum pressure is restored when a vacuum pressure is reduced below 60 kPa after a vacuum pressure is formed.

At this time, by numerically displaying the vacuum pressure on the display apparatuses 52 of the vacuum display unit, the vacuum pressure acting on each of the vacuum suction holes 24 and 34 of the vacuum base plate 20 and the vacuum folding plate 30, whether the vacuum pressure is properly acting on the vacuum base plate 20 and the vacuum folding plate 30 can be easily checked. Preferably, a sensor is provided at the vacuum display unit. Therefore, when the vacuum pressure is reduced below the predetermined vacuum pressure, the sensor automatically detects whether the vacuum pressure is reduced below the predetermined vacuum pressure, and the vacuum pressure is restored to the vacuum pressure equal to or more than the predetermined vacuum pressure.

As described above, the present disclosure has characteristics in which a vacuum pressure is maintained for each stage and the vacuum pressure is restored during manufacturing a secondary battery. Further, the vacuum carrier of the present disclosure is used in a pouch manufacturing stage that is one stage of a secondary battery manufacturing process stage. The pouch manufacturing stage is a stage in which a battery cell is mounted inside a pouch. In the pouch manufacturing stage, a pouch sheet 4 seated on the inner surfaces of the vacuum base plate 20 and the vacuum folding plate 30 is brought into close contact with the inner surfaces of the vacuum base plate 20 and the vacuum folding plate 30 by a vacuum pressure through each of the vacuum suction holes 24 and 34. In this state, by folding the vacuum folding plate 30 into the inner surface of the vacuum base plate 20, a battery cell 6 may be mounted inside the pouch.

Of course, the pouch manufacturing stage is one stage of the secondary battery manufacturing stage. Further, the vacuum carrier of the present disclosure supplies and restores a vacuum pressure for each stage.

In each stage of the secondary battery manufacturing stage, since the pouch is fixed by the vacuum pressure when the vacuum carrier is opened or closed, the pouch is prevented from being misaligned. Opening and closing the vacuum carrier means opening and closing the vacuum folding plate 30 on the vacuum base plate 20. Accordingly, since the pouch is fixed by the vacuum pressure when the vacuum carrier is opened or closed in each process stage, the pouch is prevented from being misaligned. In addition, since the pouch is prevented from being misaligned in each process stage of the secondary battery, a problem of setback that may occur during a manufacturing process is solved.

In addition, in the present disclosure, the vacuum passages 20VP and 30VP and the vacuum suction holes 24 and 34 are separated into several sections, so that a vacuum is maintained separately for each section.

Figure 6:
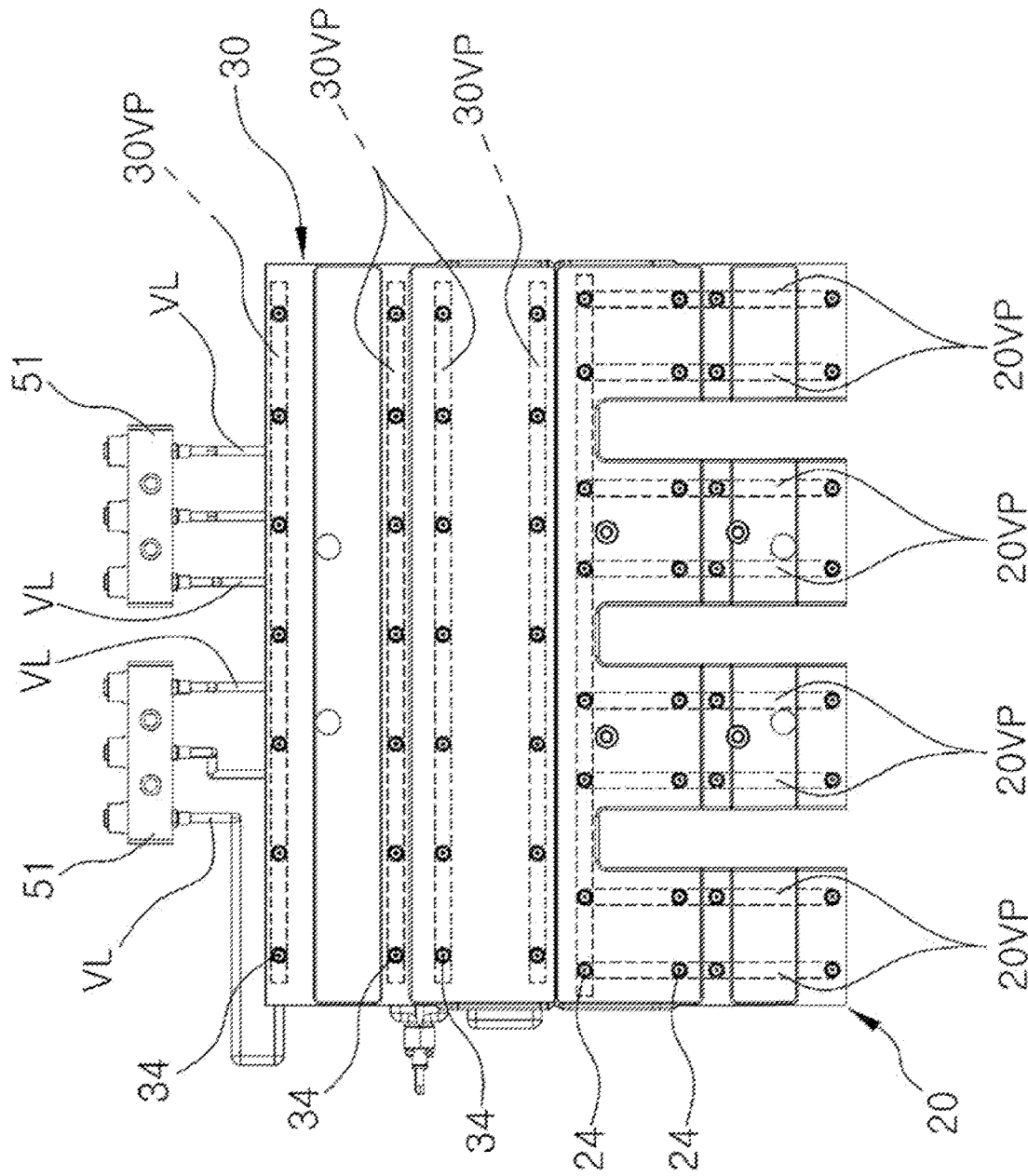
FIG. 6 is a plan view schematically illustrating a structure in which vacuum passages and vacuum suction holes are provided in several sections in the vacuum carrier of the present disclosure.

The vacuum passages 20VP inside the vacuum base plate 20 are separated from each other for each section, and the vacuum passages 20VP for each section are in communication with the vacuum suction holes 24 for each section. In the present disclosure, three vacuum lines VL are separately in communication with the vacuum passages 20VP and vacuum suction holes 24 for each section. The plurality of vacuum suction holes 24 are disposed in the vacuum base plate 20 in row and column directions. Further, the vacuum passages 20VP are separately in communication with the vacuum suction holes 24 in a first row, the vacuum suction holes 24 in second and third rows, and the vacuum suction holes 24 in a fourth row. Furthermore, each of the vacuum lines VL is separately connected to the vacuum suction holes 24 for each section (i.e., for each row) (see FIG. 6).

The vacuum passages 30VP inside the vacuum folding plate 30 are also separated for each section, and the vacuum suction holes 34 for each section are in communication with the vacuum passages 30VP for each section. In the present disclosure, other three vacuum lines VL that are provided separately from the three vacuum lines VL that are connected to the vacuum base plate 20 are separately in communication with the vacuum passages 30VP and the vacuum suction holes 34 for each section. The plurality of vacuum suction holes 34 are also disposed in the vacuum folding plate 30 in row and column directions. Further, the vacuum passages 30VP are separately in communication with the vacuum suction holes 34 in two columns separately provided in each of the sectored vacuum folding plate portions. Furthermore, each of the vacuum lines VL is separately connected to the vacuum suction holes 34 for each section (i.e., for each of the sectored vacuum folding plate portions) (see FIG. 6).

When the vacuum suction holes 24 and 34 inside the vacuum carrier (in other words, inside the vacuum base plate 20 and the vacuum folding plate 30) are all connected to one vacuum line VL, there is a problem that the vacuum of the entire vacuum carrier is released when the vacuum is released in any one position.

However, in the present disclosure, since the vacuum is separately maintained for each section by separating the vacuum suction holes 24 and 34 into several sections, the problem that the vacuum of the entire vacuum carrier is released is solved. By separating the vacuum suction holes 24 and 34 for each section of the vacuum base plate 20 and the vacuum folding plate 30, the vacuum is not released and the vacuum pressure is maintained in other sections of the vacuum suction holes 24 and 34 even if the vacuum is released in the vacuum suction holes 24 and 34 in some sections of the vacuum base plate 20 and the vacuum folding plate 30. Therefore, the vacuum release of the entire of the vacuum carrier may be prevented, i.e., the vacuum release of the entire vacuum base plate 20 and the entire vacuum folding plate 30 may be prevented.

INDUSTRIAL APPLICABILITY

The present disclosure relates to a vacuum carrier, the vacuum carrier including: a vacuum base having vacuum passages formed therein, the vacuum passages being connected to vacuum suction holes; and a vacuum unit configured to form a vacuum by suctioning air from the vacuum passages inside the vacuum base, and the vacuum carrier can be efficiently utilized at each stage of a secondary battery manufacturing process by forming a vacuum pressure in various stages during manufacturing a secondary battery and by restoring the vacuum pressure when the vacuum pressure is reduced below a predetermined vacuum pressure, so that the vacuum carrier of the present disclosure is industrially applicable.

The invention claimed is:

1. A vacuum carrier comprising:
   a vacuum base having vacuum passages formed therein, the vacuum passages being connected to a plurality of vacuum suction holes; and
   a vacuum unit configured to form a vacuum by suctioning air from the vacuum passages inside the vacuum base, wherein
   the vacuum unit comprises:
      a vacuum filling block having a plurality of suction ports; and
      a movement driving apparatus configured to move the vacuum filling block such that the plurality of suction ports of the vacuum filling block are connected to the vacuum passages inside the vacuum base,
   the vacuum base comprises:
      a vacuum base plate mounted at a support frame; and
      a vacuum folding plate configured to be folded into an inner surface of the vacuum base plate,
   the plurality of vacuum suction holes are provided in the inner surface of the vacuum base plate and an inner surface of the vacuum folding plate, and
   a plurality of vacuum lines are connected to the vacuum passages inside the vacuum base plate and the vacuum folding plate is supported on a vacuum connection block, and the plurality of suction ports of the vacuum filling block are connected to the plurality of vacuum lines supported on the vacuum connection block by the movement driving apparatus.

2. The vacuum carrier of claim 1, wherein, in a state in which the vacuum filling block is moved forward to the vacuum connection block and is connected to the plurality of vacuum lines, the vacuum is formed by suctioning air from the vacuum passages inside the vacuum base plate and the vacuum folding plate.

* * * * *